US009172960B1

(12) United States Patent
Ben-Yaacov et al.

(10) Patent No.: US 9,172,960 B1
(45) Date of Patent: Oct. 27, 2015

(54) QUANTIZATION BASED ON STATISTICS AND THRESHOLD OF LUMINANCE AND CHROMINANCE

(75) Inventors: Hilla Ben-Yaacov, Bat-Yam (IL); Eran David Pinhasov, Zichron Yaakov (IL)

(73) Assignee: QUALCOMM TECHNOLOGIES, INC., San Diego, CA (US)

( * ) Notice: Subject to any disclaimer, the term of this patent is extended or adjusted under 35 U.S.C. 154(b) by 320 days.

(21) Appl. No.: 13/237,623

(22) Filed: Sep. 20, 2011

Related U.S. Application Data (60) Provisional application No. 61/385,773, filed on Sep. 23, 2010.

(51) Int. Cl.
*H04N 19/124* (2014.01)
(52) U.S. Cl.
CPC .................................. *H04N 19/124* (2014.11)
(58) Field of Classification Search
CPC ............................... H04N 7/50; H04N 19/124
USPC ....................................................... 375/240.24
See application file for complete search history.

(56) References Cited

U.S. PATENT DOCUMENTS

| 4,493,091 | A | * | 1/1985 | Gundry | 375/249 |
|---|---|---|---|---|---|
| 4,722,003 | A | * | 1/1988 | Kondo | 375/240.24 |
| 5,051,770 | A | * | 9/1991 | Cornuejols | 396/125 |
| 5,294,974 | A | * | 3/1994 | Naimpally et al. | 348/395.1 |
| 5,434,623 | A | | 7/1995 | Coleman et al. | |
| 5,440,344 | A | | 8/1995 | Asamura et al. | |
| 5,526,052 | A | | 6/1996 | Ar | |
| 5,847,766 | A | | 12/1998 | Peak | |
| 5,889,561 | A | * | 3/1999 | Kwok et al. | 375/240.03 |
| 6,333,948 | B1 | * | 12/2001 | Kurobe et al. | 375/240.13 |
| 6,603,813 | B1 | | 8/2003 | Sriram et al. | |
| 6,639,942 | B1 | * | 10/2003 | Bayazit | 375/240.01 |
| 7,623,706 | B1 | * | 11/2009 | Maurer | 382/167 |
| 7,705,884 | B2 | | 4/2010 | Pinto et al. | |
| 2001/0007599 | A1 | * | 7/2001 | Iguchi et al. | 382/274 |
| 2001/0033691 | A1 | * | 10/2001 | Kimura | 382/199 |
| 2001/0053248 | A1 | * | 12/2001 | Maeda | 382/165 |
| 2002/0054210 | A1 | * | 5/2002 | Glier et al. | 348/149 |
| 2002/0158971 | A1 | * | 10/2002 | Daiku et al. | 348/226.1 |
| 2003/0202707 | A1 | * | 10/2003 | Thyagarajan et al. | 382/239 |
| 2003/0212551 | A1 | * | 11/2003 | Rose et al. | 704/230 |
| 2004/0013202 | A1 | * | 1/2004 | Lainema | 375/240.18 |
| 2004/0042676 | A1 | * | 3/2004 | Srinivasa | 382/254 |
| 2004/0080444 | A1 | * | 4/2004 | Meyers et al. | 341/159 |
| 2005/0036558 | A1 | * | 2/2005 | Dumitras et al. | 375/240.29 |

(Continued)

*Primary Examiner* — Jay Patel
*Assistant Examiner* — Joseph Suh
(74) *Attorney, Agent, or Firm* — Knobbe, Martens, Olson & Bear LLP (57) ABSTRACT

Embodiments are directed towards modifying a quality of an image without affecting a bit rate associated with a video sequence of images. For each macro-block (MB) or sub-block within a MB for a target image to be encoded, various statistics are determined for a luminance component and chrominance components that provide at least average values for the chrominance components that may then be used to identify saturation thresholds. The saturation thresholds are used to determine a Qlevel. An average Qlevel from at least a previous frame is used to generate a Q modulation factor that may be combined with an activity based modulation factor and/or variance based modulation factor, or used singly. The final quantizer is calculated by bit-rate controller base quantizer multiplied by the Q modulation factor, and may be used to encode a MB or sub-block within a MB.

17 Claims, 8 Drawing Sheets

(56) References Cited

U.S. PATENT DOCUMENTS

| | | | |
|---|---|---|---|
| 2005/0099536 A1* | 5/2005 | Zhu | 348/450 |
| 2005/0152449 A1* | 7/2005 | Nemiroff et al. | 375/240.03 |
| 2005/0152499 A1* | 7/2005 | Zhao et al. | 378/147 |
| 2006/0007985 A1* | 1/2006 | Larsson | 375/130 |
| 2006/0140477 A1* | 6/2006 | Kurumisawa et al. | 382/169 |
| 2006/0188018 A1* | 8/2006 | Lin | 375/240.16 |
| 2006/0280361 A1* | 12/2006 | Umeda | 382/167 |
| 2007/0071335 A1* | 3/2007 | Thyagarajan et al. | 382/239 |
| 2008/0075427 A1* | 3/2008 | Yamaguchi et al. | 386/84 |
| 2008/0080616 A1* | 4/2008 | Seok et al. | 375/240.16 |
| 2008/0089580 A1* | 4/2008 | Marcu | 382/162 |
| 2008/0159385 A1* | 7/2008 | Joyce et al. | 375/240.03 |
| 2008/0159409 A1* | 7/2008 | Yu et al. | 375/240.26 |
| 2008/0165845 A1 | 7/2008 | Singh et al. | |
| 2008/0253448 A1* | 10/2008 | Lin et al. | 375/240.03 |
| 2008/0260041 A1* | 10/2008 | Au et al. | 375/240.24 |
| 2008/0285647 A1* | 11/2008 | Sugiyama et al. | 375/240.03 |
| 2008/0298469 A1 | 12/2008 | Liu et al. | |
| 2009/0086816 A1* | 4/2009 | Leontaris et al. | 375/240.03 |
| 2009/0161753 A1 | 6/2009 | Youn et al. | |
| 2009/0168869 A1* | 7/2009 | Melamed et al. | 375/240.03 |
| 2009/0168878 A1* | 7/2009 | Kawashima | 375/240.13 |
| 2009/0202164 A1* | 8/2009 | Rossato et al. | 382/238 |
| 2009/0323810 A1* | 12/2009 | Liu et al. | 375/240.16 |
| 2010/0073510 A1* | 3/2010 | Nemoto | 348/223.1 |
| 2010/0226439 A1* | 9/2010 | Juri et al. | 375/240.16 |
| 2010/0260257 A1 | 10/2010 | Zhou et al. | |
| 2010/0303365 A1* | 12/2010 | Zhang et al. | 382/203 |
| 2013/0142262 A1* | 6/2013 | Ye et al. | 375/240.16 |

* cited by examiner

QUANTIZATION BASED ON STATISTICS AND THRESHOLD OF LUMINANCE AND CHROMINANCE

CROSS-REFERENCE TO RELATED APPLICATION

This utility patent application claims benefit to U.S. Provisional Patent Application Ser. No. 61/385,773 filed on Sep. 23, 2010, and entitled "Luma/Chroma Based Quantization," the benefit of which is claimed under 35 U.S.C. §119, and which is incorporated herein by reference.

TECHNICAL FIELD

The present embodiments relate generally to image compression and, more particularly, but not exclusively, to splitting an image frame into a plurality of areas, and for each area, employing an average (or D.C.) value for chrominance components and a luminance component for use in assessing a saturation level useable to determine a Q quantizer that can be used to scale a quality of the image within each area during encoding of the image. In one embodiment, the saturation is a combination of luminance and chrominance saturation. In another embodiment, it is luminance saturation.

BACKGROUND

Video systems today often employ a variety of different techniques to reduce an amount of data for a video sequence that is to be stored and/or transferred over a network, or other communication's channel. Many such video systems may use a compression scheme to reduce a bit rate or an amount of data that may represent the video sequence during storage and/or transmission. Single images are also often compressed to reduce an amount of storage use and/or a load on a communication channel during transmission.

Many video compression techniques select to divide a frame (or single image in the video sequence) into smaller parts, sometimes called Macro-Blocks (MB). An encoder may then be employed to change a quantization strength at a given MB level, and decide how to divide bits between a frame's MBs. An amount of bits used to code a MB is typically an inverse ratio to a quantizer value. For example, for a same MB, using a higher quantizer value may result in fewer bits in a final bit-stream that represents the frame. However, an image quality may sometimes decrease with an increase in the quantizer value used to encode or otherwise compress the image. This may be a result of an inaccurate representation of the MB in the coded bit-stream, becoming increasingly more inaccurate with increasing quantizer values. Inaccurate representations of the image or images in a video sequence may result in non-constant quality over the entire image, as perceived by the human eye. This may be because the human eye is often more sensitive to certain frequencies, textures and colors than others, which may become distorted or lost during use of the quantizer. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present embodiments, reference will be made to the following Detailed Description, which is to be read in association with the accompanying drawings, in which.

DETAILED DESCRIPTION

The present embodiments now will be described more fully hereinafter with reference to the accompanying drawings, which form a part hereof, and which show, by way of illustration, specific aspects in which the embodiments may be practiced. These embodiments may, however, take many different forms and should not be construed as limited to the embodiments set forth herein; rather, these embodiments are provided so that this disclosure will be thorough and complete, and will fully convey the scope to those skilled in the art. Among other things, the present embodiments may include methods or devices. Accordingly, the present embodiments may take the form of entirely hardware or a combination of software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "image," or "image data," refers to data that defines an image to be displayed in at least two dimensions, and may take the form of a single display of the image, or a time varying display of a sequence of images comprising multiple video frames which may be spaced in time. For example, such image may be a signal that might be a moving scene derived from a video camera, or other photo-sensing and recording mechanism.

As used herein, the term "quantizer" is intended to refer to a value or values useable for modifying, such as by scaling, a transformation of an input target image or portion of an input target image. For example, where the transformation of the input target image is represented as coefficients obtained from a discrete cosine transform (DCT), the modification of the transformation may include dividing a coefficient obtained from the DCT by the quantizer. In one embodiment, a result of the division may further be rounded to a nearest integer value.

The following briefly describes the embodiments in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards modifying a quality of an image without affecting a bit rate associated with a video sequence of images. For each macro-block or for each sub-block within a macro-block for a target image frame to be encoded, various statistics are determined for a luminance component and chrominance components that provide at least an average (or d.c.) that may then be used to identify luminance and/or chrominance saturation thresholds based on ranges of a statistic for the chrominance components. Other statistics, including, variances, range values, and the like, may also be determined for each of the components. The saturation thresholds are useable in part to determine a Qlevel. An average Qlevel from at least a previous frame is used to generate a modulated Q factor that, in one embodiment, may be combined with an activity factor and/or variance factor, or used singly, as a quantizer to encode a transformation of the macro-block or sub-block.

In addition, while the disclosure below discusses a video sequence of images or digital video signals as the input, other inputs may also be used, including, for example, a single image or single frame of an image, such as a single still picture, or the like.

Illustrative Operating Environments

Figure 1:
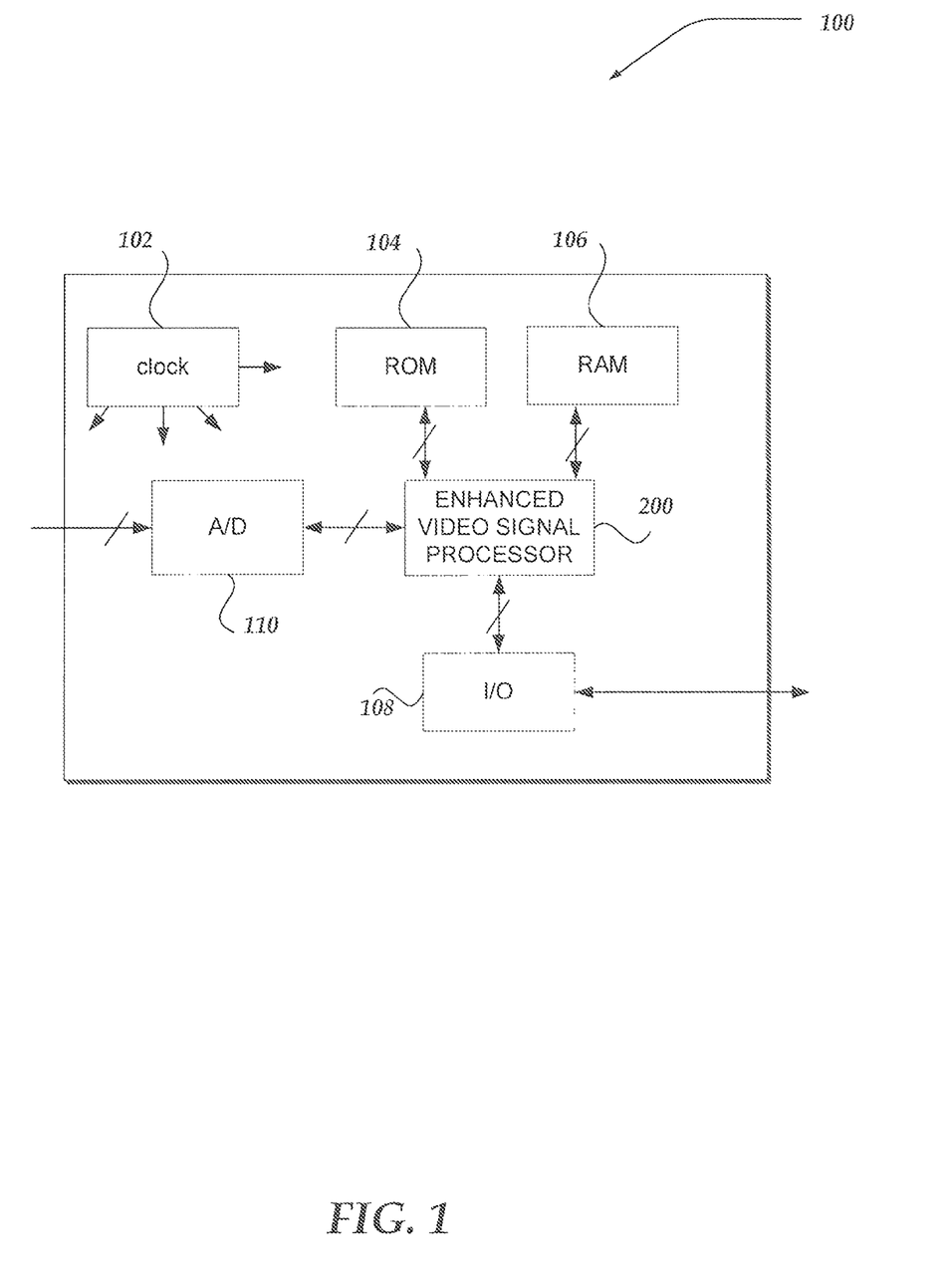
FIG. 1 illustrates a system diagram of one embodiment of an environment in which the embodiments may be practiced.

FIG. 1 shows components of an environment in which embodiments may be practiced. Not all the components may be required to practice the embodiments, and variations in the arrangement and type of the components may be made without departing from the spirit or scope of the invention. Moreover, various implementations of the system may include many more or less components than those shown in FIG. 1. However, the components shown are sufficient to disclose an illustrative embodiment for practicing the present invention.

As shown, system 100 of FIG. 1 may represent a camera or any of a variety of other possible portable devices, including video cameras, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like, that may be configurable to receive and process images, including image sequences. In one embodiment, system 100 may include components not shown, such as a lens or other optical elements, and image sensor(s) for receiving images that may be converted into a digital image for storage within one or more storage devices.

As shown, system 100 may include components on a single integrated circuit chip or on a plurality of different circuit chips. In any event, components shown in FIG. 1 include a clock circuit 102 for providing clocking signals to the circuit chips and other components. While illustrated as a separate component, it should be understood that clock circuit 102 may also be included on Enhanced Video Signal Processor (EVSP) 200, or the like.

Also shown is a volatile random-access memory (RAM) circuit chip 106 that may be coupled to EVSP 200 to provide temporary data storage. In one embodiment, RAM 106 may be configured to receive and store image data, such as one or more frames of image data for use by EVSP 200 or output data from EVSP 200. A separate non-volatile read-only memory (ROM) memory chip 104 is also coupled to EVSP 200 and may be employed for storage of a processor program, calibration data, look-up tables (LUTS), non-linear functions, saturation threshold tables, threshold functions, a variety of other data useable by system 100, and the like. In one embodiment, ROM 104 may be flash memory, which is re-programmable, or a memory that is programmable once, such as programmable read-only memory (PROM), electrically programmable read-only memory (EEPROM), or any of a variety of other storage devices.

Although not illustrated, other type of memory or physical storage devices may be included within system 100, including, for example, memory cards that may, include semi-conductor flash electrically erasable and programmable read-only memory, removable rotating magnetic disk storage, removable universal serial bus (USB) devices, or any of a variety of other storage devices. In one embodiment, system 100 may also be configured through Input/Output (I/O) device 108 to access storage devices that may be external to system 100. Thus, it should be understood that EVSP 200 may he configured to receive one or more frames of image data, operate upon the received one or more frames of image data, and store or otherwise send a resulting encoded bit-stream of data using a variety of storage devices, and/or communication mechanisms, and therefore is not limited to merely those described herein.

I/O device 108 includes circuitry for coupling system 100 to one or more external devices, networks or the like, and is constructed for use with one or more communication protocols and technologies, including any of a variety of communication protocols and technologies useable for communicating images, including video images to and/or from system 100. In one embodiment, I/O device 108 is sometimes known as a transceiver, transceiving device, or network interface card (NIC).

I/O device 108 may also provide for various other communications, including for use various input devices, such as keypads, touch screens, or the like, as well as output devices including screen displays, audio outputs, or the like. Thus, although not shown, system 100 may also include a speaker and/or microphone that may be coupled to I/O device 108 to enable communications. System 100 may also include a display that may include a liquid crystal display (LCD), gas plasma, light emitting diode (LED), or any other type of display usable for providing text and/or an image for display. Further, in one embodiment, the display may also include a touch sensitive screen arranged to receive input from an object such as a stylus or a digit from a human hand.

Also illustrated, is an analog-to-digital converter (A/D) 110 that may be configured to receive an analog signal representing an image, and to convert the received signal into digital image data that, in one embodiment, may be a sequence of individual blocks of digital image data representing an intensity of light that may be received through various photo-detectors of an image sensor and/or lens arrangement (not shown). A/D 110 may then provide the digital data to EVSP 200 for processing.

Figure 2:
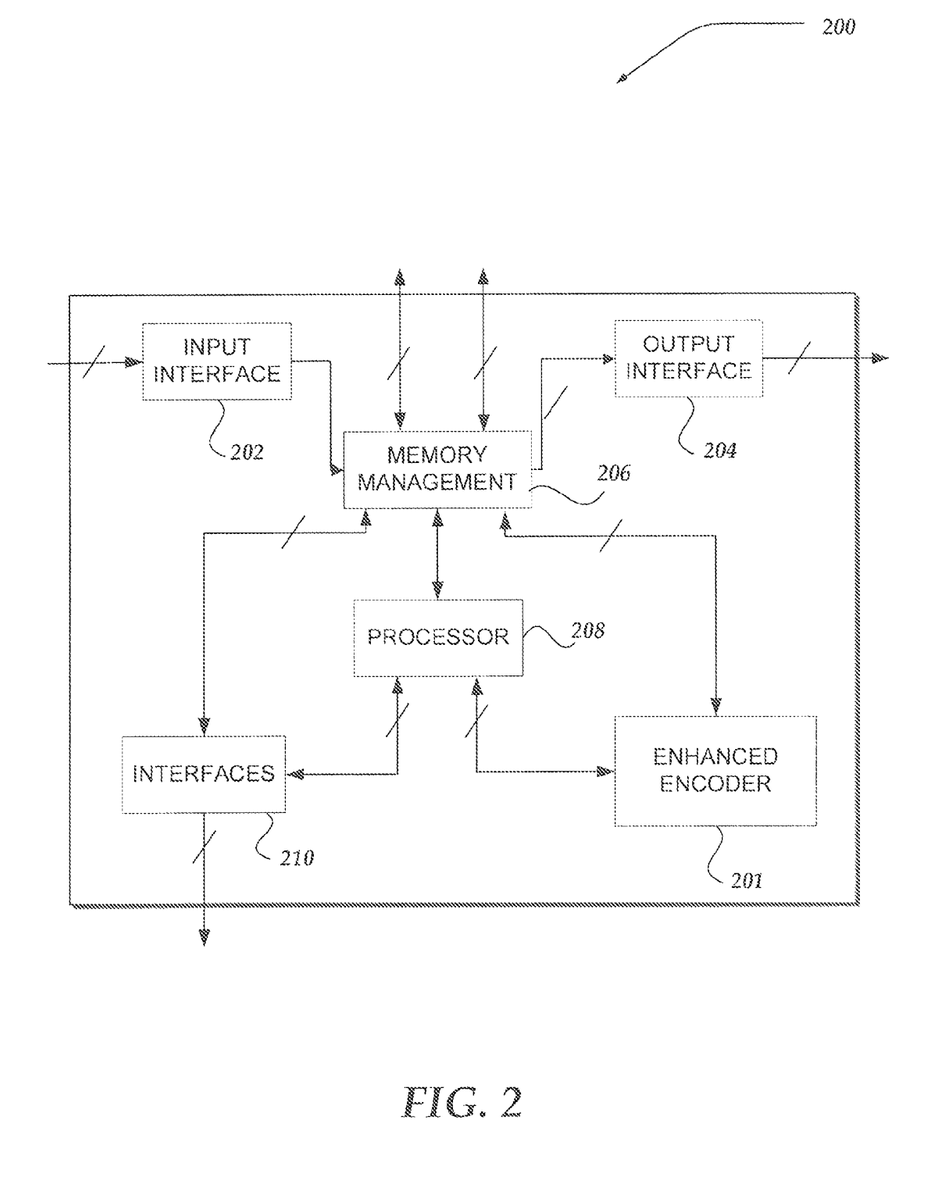
FIG. 2 shows one embodiment of an enhanced video signal processor usable for practicing various embodiments.

One embodiment of EVSP 200 is shown in FIG. 2. EVSP 200 may include many more or less components than those shown. The components shown, however, are sufficient to disclose an illustrative embodiment for practicing various embodiments.

As shown in FIG. 2, EVSP 200 may include processor 208 that may represent a general purpose or a specialized computer processing unit (CPU) that is configured to perform a variety of calculations on an image and/or sequence of images and to control various operations of system 100 in response to computer-readable instructions that may be stored within one of the memory devices of FIG. 1, such as ROM 104, or the like. In one embodiment, digital data of one or more image frames representing may be received by input interface circuit 202 and communicated to other components by connection through memory management device 206. In one embodiment, Enhanced Encoder (EE) 201 may be employed as described further below, to provide encoding (or compression) of the one or more image frames using a Y/C based modulation employing at least d.c. values for determined luminance and chrominance components for the given image. Additionally, EE 201 may provide for stabilization of an image through various techniques such as motion estimation, and/or motion compensation. The output may then be a modified hit-stream representing the one or more image frames that may be output through output interface circuit 204 to various memory storage devices, or even over a network, including, a wireless and/or wired network, to another device.

Interfaces 210 may provide for various mechanisms to communicate with processor 208 and/or memory management 206, other components, to enable modifications to various actions, provide status of an action, or the like by another device, an end-user, or the like.

Illustrative Network Device

Figure 3:
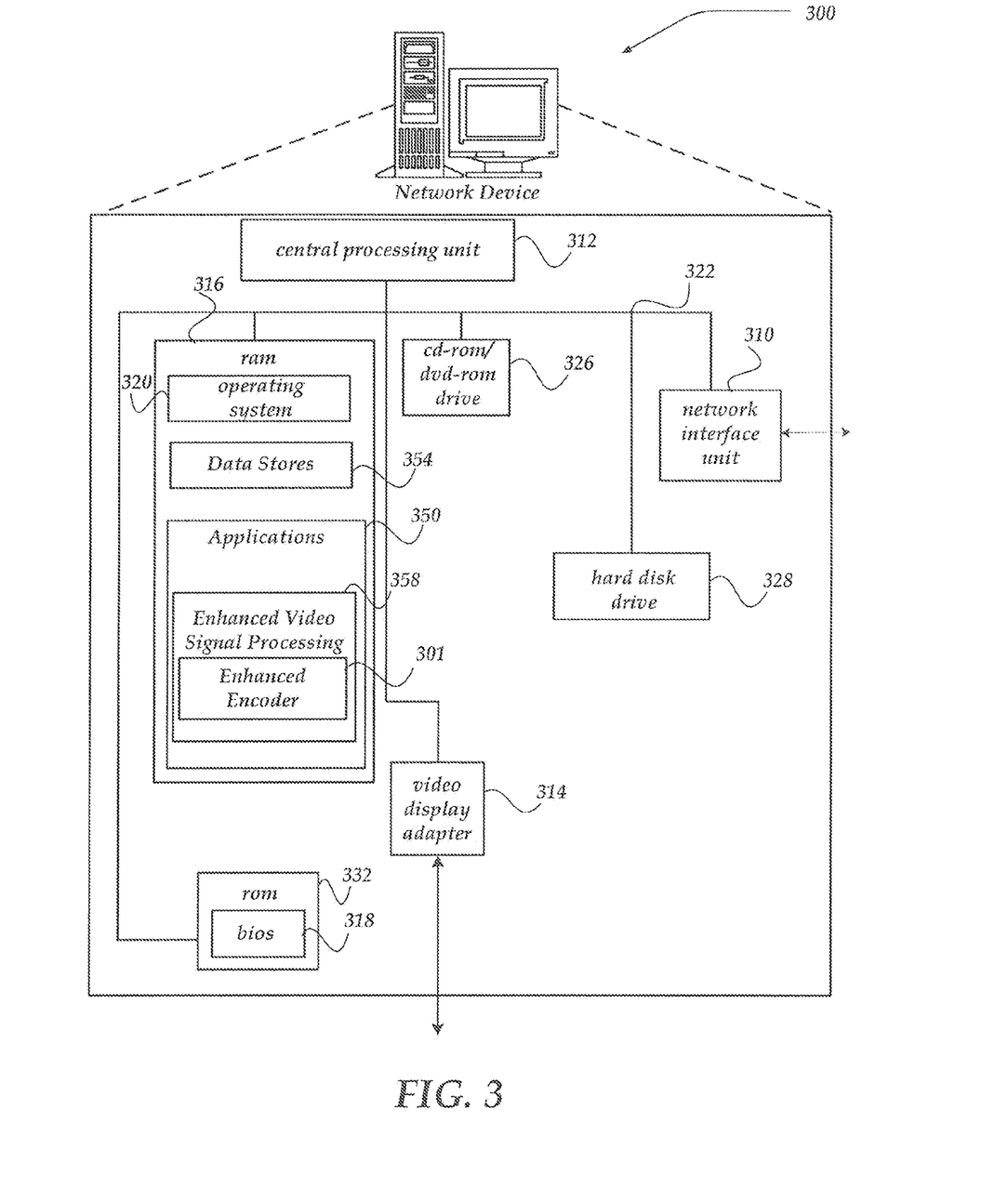
FIG. 3 illustrates a system diagram of another embodiment of an environment in which the embodiments may be practiced.

FIG. 3 shows one embodiment of another device useable with another embodiment of the EVSP. Network device 300 may include many more or less components than those shown. The components shown, however, are sufficient to disclose an illustrative embodiment for practicing the invention. Network device 300 may represent any of a variety of computing devices, including, but not limited to personal computers, desktop computers, multiprocessor systems, microprocessor-based or programmable electronics, a rack mounted multi-processing configuration, network PCs, televisions, camera systems, server devices, network appliances, and the like. In one embodiment, while a single network device 300 is illustrated, operations discussed with respect to at least the EVSP and/or EE, may also be distributed across a plurality of computing devices, for example, such as might arise within a cloud architecture, a peer-to-peer structure, a cluster architecture, or other distributed architectures.

Network device 300 includes central processing unit 312, video display adapter 314, and a mass memory, all in communication with each other via bus 322. The mass memory generally includes RAM 316, ROM 332, and one or more permanent mass storage devices, such as hard disk drive 328, tape drive, compact-disc read only memory (CD-ROM)/digital versatile disc-ROM (DVD-ROM) drive 326, and/or floppy disk drive. The mass memory stores operating system 320 for controlling the operation of network device 300. Any general-purpose operating system or special purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/1P protocol. Network interface unit 310 is sometimes known as a transceiver, transceiving device, or network interface card (NIC).

The mass memory as described above illustrates another type of computer-readable or processor-readable device, namely computer-readable storage media. Computer-readable storage media (devices) may include volatile, nonvolatile, non-transitory, removable, and non-removable media implemented in any method or technology for storage of information, such as computer readable instructions, data structures, program modules, or other data. Examples of computer-readable storage media include RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data stores 354 may include a database, text, spreadsheet, folder, file, or the like, that may be configured to maintain and store data useable for Enhanced Encoder 301, including, range data, threshold data, function look-ups, tables, video images, single images, encoded data, reconstructed frame data, reference frame data, motion vectors, one or more frame data, or the like. Data stores 354 may further include program code, data, algorithms, and the like, for use by a processor, such as central processing unit (CPU) 312 to execute and perform actions. In one embodiment, at least some of data and/or instructions stored in data stores 354 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 are loaded into mass memory and run on operating system 320. Examples of application programs may include transcoders, schedulers, customizable user interface programs, security programs, and so forth. Memory may also include EVSP 358 which may further include EE 301. It should be recognized that while EVSP 358 and EE 301 are illustrated within RAM 316, other embodiments may include EVSP 358 and/or EE 301 within ROM 332, and/or within one or more separate circuit boards (not shown) within network device 300.

EVSP 358 and EE 301 operate substantially similar to EVSP 200 and EE 201 of FIGS. 1-2, respectively, to provide for encoding (or compression) of the one or more image frames using a Y/C based modulation employing at least d.c. values, such as averages or the like, for determined luminance and chrominance components to a given image, as described in more detail below.

It should be recognized that EVSP 358 and EE 301 may operate on image data obtained from data stores 354, hard disk drive 328, cd-rom/dvd-rom drive 326, other storage devices, or even from a network or from another device through network interface unit 310.

Generalized Operation

The operation of certain aspects of the invention will now be described with respect to FIGS. 4-8. The operations of the processes described below may, in one embodiment, be performed within EVSP 200 and/or EE 201 of FIGS. 1-2, and/or within EVSP 358 and EE 301 of FIG. 3.

Prior to discussing how various embodiments of the EVSP/EE operate, it may be of interest to first discuss how an image and/or sequence of images may be received and prepared for processing in one embodiment.

Figure 4:
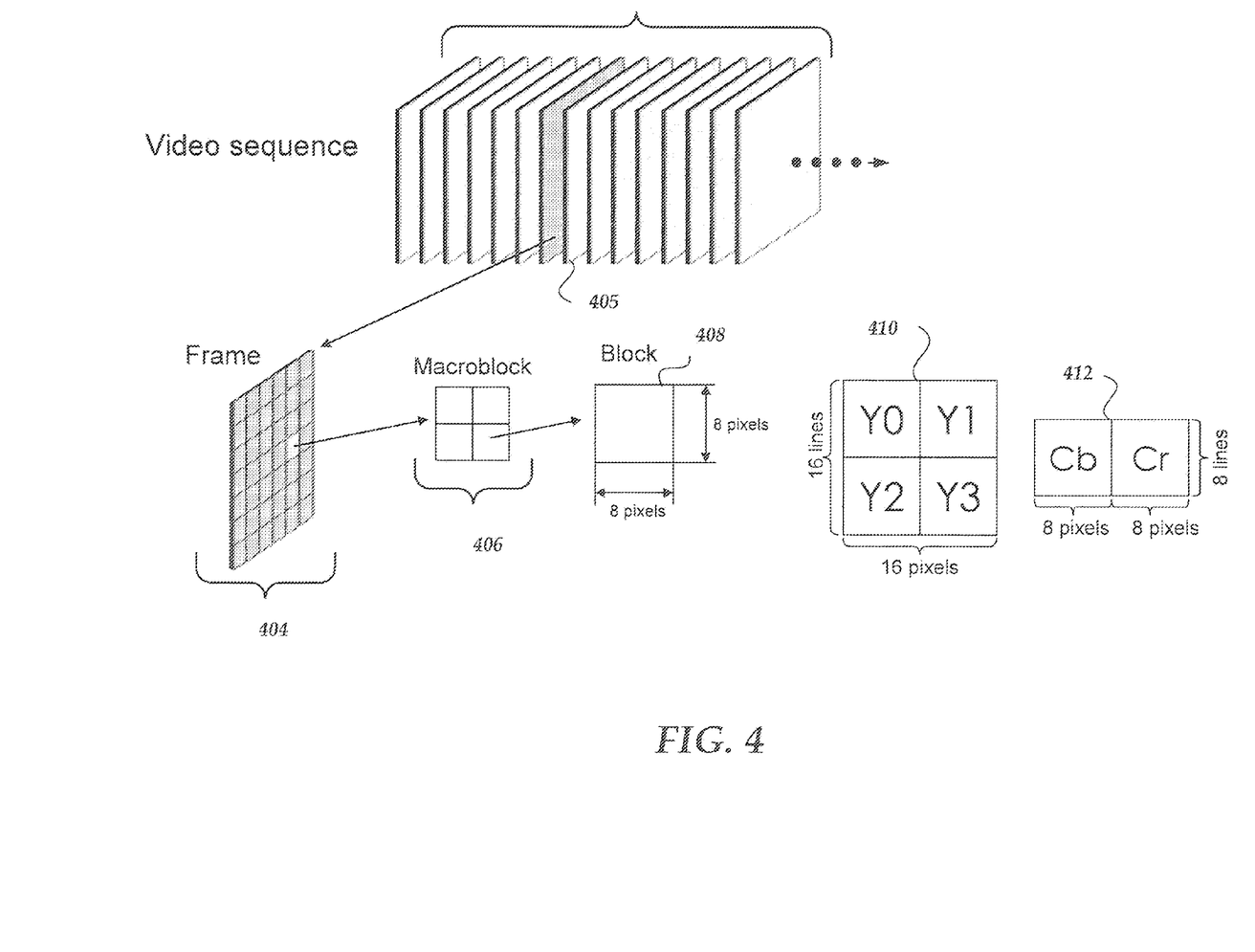
FIG. 4 illustrates one non-limiting, non-exhaustive example of a decomposition of a target frame into at least one luminance component and complementary chrominance components within a given sub-block of a Macro-Block.

FIG. 4 illustrates one non-limiting, non-exhaustive representation of a video sequence of images. In one embodiment, the video sequence may include a plurality of frames 402, each frame representing a single capture of a picture or image of some scene. The sequence of images represents 'changes' of the image over time. Thus, for example, frame 404 may represent the image at one time, while frame 405 may represent the image at a second different time, although this is not required.

Frames within the plurality of frames 402 may be coded using any of a variety of mechanisms including those defined by the Joint Video Team (JVT) of the ISO/IEC Moving Picture Expert Group (MPEG) and the ITU-T Video Coding Experts (VCEG). However, it should be understood that embodiments discussed within are not constrained to a particular type of coding mechanism, and any of a variety of other formats, standards, or the like, may also be used. In any event, as shown, frame 404 (or any other frame) may be divided into a set of pixel arrays, such as 16×16 pixels in size, and each pixel array may then be termed a Macro-Block (MB), such as MB 406. It should be recognized that other pixel array sizes may also be employed, including for example, 8×8, 64×64, or even pixel arrays where a number. of rows are different from a number of columns within the pixel array. In any event, as is further illustrated in FIG. 4, each MB 406 may be further divided into a plurality of blocks. As shown, one non-limiting example of a block, Block 408, illustrates that MB 406 is divided into four blocks, each of 8×8 pixels. However, other sizes of blocks may also be selected.

In one embodiment, the plurality of frames 402 may be obtained from an analog source, and be represented by red (R), green (G), and blue (B) lines that may be converted into color difference components using, for example, various processes. For example, in one embodiment, such color difference components may be obtained based on the Rec. 601 (formally known as the CCIR-601) component color television standard from the International Telecommunication Union (ITU) Radio communication Sector (ITU-R). However, any of a variety of other techniques may also be employed, and embodiments are not constrained to a particular standard, or format. In any event, by way of example only, the image data may be defined by three components of the image signal; namely, a luminance component (Y), and two complementary chrominance components (V=R−Y) and (U=B−Y). For three dimensional or higher dimensional images, and/or other types of image representations, other components may also be included.

In any event, in this example, each image sub-block (block 408) may be formed of a given number of pixels of the image. A Y block 410, may comprise 16 pixels horizontally and 16 lines of pixels vertically. Where the image data includes a color signal, then the image sub-blocks (block 408) further include color information in the form of chrominance components, Cb and Cr, where Cb and Cr are the blue-difference (U) and red-difference (V) components, respectively. Each of the color components may be represented by respectively superimposed color blocks 412.

Various mechanisms may be employed to convert the RGB data signals into color difference components, including for example using a matrix circuit to provide the luminance (Y), and chrominance (Cb, Cr) component signals. In one embodiment, the luminance component and the chrominance components may be received as analog signals that are provided to respective low pass (or equal bandwidth) filters and passed through analog-to-digital converters, to generate a digital data format. In one embodiment, the filtered and digitized luminance and chrominance components may be supplied to a block forming circuit, in one embodiment, where the described image blocks may be formed.

The plurality of frames 402 described above and in FIG. 4 may then be provided to the EVSP to perform encoding using at least the Y/C based modulation. In one embodiment, the plurality of frames 402 may be provided to the EVSP in real-time. However, in another embodiment, the plurality of frames 402 may be stored on various storage devices, such as those disclosed above. For ease of discussion, frame 404 may be considered as a target frame upon which the EVSP operates, while frame 405 may be considered as a previous target frame upon which the EVSP has previously operated to generate an entropy coded bit-stream.

Figure 5:
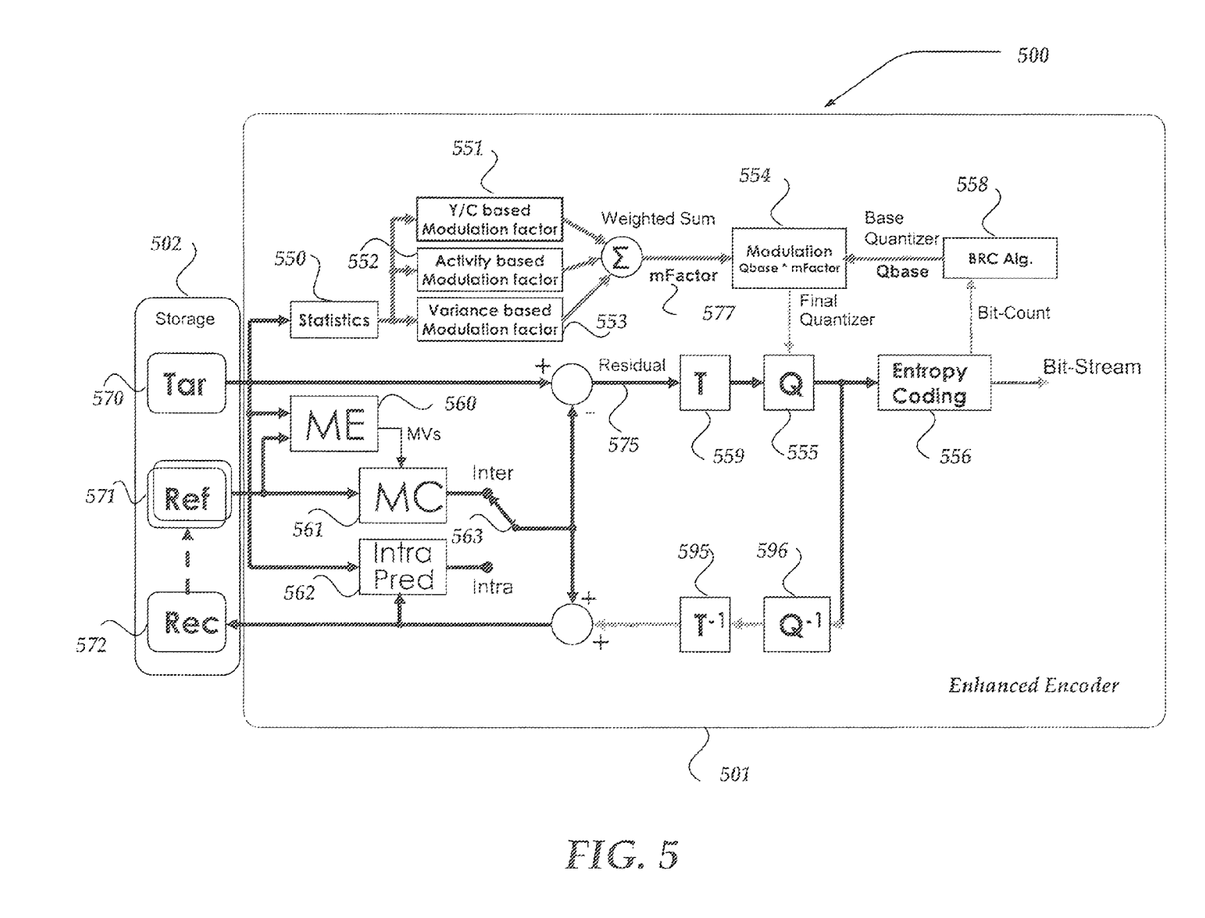
FIG. 5 illustrates one embodiment of an enhanced image encoder with Y/C based modulation using d.c. factors.

Turning next to operations of the EVSP, FIG. 5 illustrates one embodiment of an enhanced encoder (EE) with Y/C based modulation using average (or d.c.) factors. System 500 of FIG. 5 may include many more or less components than those shown. The components shown, however, are sufficient to disclose an illustrative embodiment for practicing the invention. A flow of data through system 500 may represent, in one embodiment, a process useable as one embodiment of the invention.

As shown, system 500 includes Enhanced Encoder (EE) 501 and a storage device 502. Storage device 502 may represent any of the storage devices discussed above, or even a mechanism for receiving image data and/or the like, over a network. Storage device 502 illustrates having stored thereon at least a target frame (Tar) 570, a reference frame (Ref) 571, and a reconstructed frame (Rec) 572. Briefly, Tar 570 represents an image frame upon which EE 501 operates to compress. Ref 571 illustrates a reconstructed image frame of a previously encoded target frame and may be used for inter-predictions, discussed below. Rec 572 represents the target image after it was compressed and then decompressed. Rec 572 therefore is intended to provide a possibly degraded comparison to Tar 570, as compression increases.

EE 501 includes a statistics component 550 that is employed to receive Tar 570 and to determine any of a variety of statistics for Tar 570. As noted elsewhere, in one embodiment, the various statistics are based on the luma/chroma components, and may include but not be limited to an average, a sum, a variance, range data, and the like. In one embodiment, statistics component 550 might determine for each sub-block within a given MB of Tar 570, an average value for each of the luminance, and the two complementary chrominance components. In one embodiment, the average value might be considered to represent a d.c., steady-state, or zero state of the component. In one embodiment, statistics component 550 may also determine range values for each of the components.

It should be noted that while one of the statistics includes an average of a component within a sub-block of an MB of the image, other statistics may also be used. For example, where it might be considered that a distribution of values for the component is non-Gaussian, statistics such as a median, mode, or the like might be used instead. Such values might still be considered to represent a d.c. or base value for the component being considered. Further statistics might also be employed, including those based on density functions, correlation functions between multiple components, or the like.

Thus, statistics component 550 may be employed to determine a variety of statistics about Tar 570 and its components.

Processing proceeds to components 551, and optionally components 552-553 to determine a Y/C based modulation factor (551), an activity based modulation factor (552), and a variance based modulation factor (553) based on the statistics and/or other data about Tar 570. The output of component 551 is a Q Factor that may be based on the process described in more detail below in conjunction with FIG. 6.

However, component 552 is configured to determine an activity modulation factor. It is recognized that some artifacts may be more visible in low activity areas of an image than in high activity areas, and so EE 501 may optionally include a modulation factor that compensates for such activity. In one embodiment, activity may be defined as a degree of variation among pixel values for a component of the image's MB or sub-block, measured, for example, using a ratio of maximum to minimum pixel values, or the like. The output of component 552 may be computed then using such range data by:

$$actFactor = \frac{2MbActivity + AverageActivity}{MbActivity + 2AverageActivity}$$

where, MbActivity represents the activity range values obtainable from the statistics, and AverageActivity is intended to represent an average of the activity from a previous target frame, or frames usable to modulate the results. In one embodiment, actFactor may be range limited to some modulation range, such as [½, 2]. However, other range values may also be selected to provide a desired modulation around an overall frame quantizer steady state, for example, to maintain a budget average for the frame's bit-count. Thus, generally, in the above equation for actFactor, the value '2' for the MbActivity, may be replaced generally with a coefficient of 'n', wherein n may be any non-zero value, and then the modulation range may generally be [1/n, n].

Similarly, component 553 optionally may be employed to determine a variance based modulation factor, varFactor, using variance values determined for each component within the given MB or sub-block of the MB of Tar 570. In one embodiment, an averageVariance may also be employed to determine the varFactor, similar to that described above for actFactor. In one embodiment, varFactor may also be range limited using a same or different range limits.

The output modulation factors from components 551-553 may then be combined using various weighting values. In one embodiment, the combination may be a weighted summation of the modulation factors. The output of the combining element is herein termed the Final Factor (mFactor 577). The weighting of each modulation factor may be selected to provide emphasis of one modulation factor over another modulation factor. Moreover, it should be noted that other modulation factors may also be determined and combined with one or more of the output modulation factors from component 551 and optionally components 552-553. For example, in some embodiments it may be desirable to account for affects across sub-blocks, and/or MBs within a frame or even across frames. Thus, in one embodiment, boundary modulation factors may also be determined, to further smooth transitions between sub-blocks within Tar 570.

In any event, mFactor 577 (Final Factor) may then be input to a quantizer calculation component 554 that provides a final quantizer, Q. In one embodiment, the final quantizer, Q, may be determined as:

$$Q = round(FrameQuantizer \cdot FinalFactor)$$

where the FrameQuantizer represents a base quantizer, Qbase, for the entire frame of Tar 570. In one embodiment, Q may be a combination, such as a rounded result from multiplication of the frameQuantizer with the Final Factor (mfactor 577). This provides a Q value that may then be provided to Quantizer (Q) component 555 to perform encoding quantization on a transformation of the sub-block of Tar 570. In one embodiment, this may be achieved by dividing coefficients in the transformation by the Final Quantizer, Q, and rounding the resulting value to a nearest integer, or more generally providing a mapping from the coefficients and Final Quantizer, Q, to a value that may then be entropy encoded by entropy coding component 556.

Entropy encoding component 556 represents any of a variety of lossless data compression schemes, where the output is compressed quantized coefficients and other header data per every MB is represented as a binary bit-stream, in one embodiment, in such a manner as to reduce redundancies in the data. Any of a variety of mechanisms may be employed including those, for example, that reorder data such that it becomes less sparse, predict values from already coded MBs/blocks, or use variable length coding with less bits for common symbols. For example, in one embodiment, the quantized coefficients may be Huffman coded where a number of the bits needed to represent the image may be reduced.

Additionally, an output of entropy encoding component 556 includes a bit rate, measured in one embodiment, in bits per second of the encoded data. This bit rate or bit-count may be provided to a Bit Rate Control Algorithm, SRC Alg. 558 component that controls the bit rate of the encoded video by changing the quantizer at a frame or MB-level as discussed above.

Transformation (T) component 559 represents any of a variety of transformation algorithms useable on a residual error after subtracting a predictor MB from the Target's MB. For example, one such encoding includes a transform from an image domain to a frequency domain, such as a discrete cosine transform (DCT) using MPEG 2, 4, and/or H.264, or some integer variation of the DCT. For example, in one embodiment, the transformation may perform a cosine transformation of each sub-block into a set of transform coefficients, each of which represents a scalar weighting parameter (i.e., coefficients) for a two-dimensional cosine transform function.

The output of Q component 555 may also be provided to inverse Q, $Q^{-1}$ component 596, and then to inverse T, $T^{-1}$ component 595, where $Q^{-1}$ component 596 provides an inverse operation of the quantization process, generating an output that are approximated residual MB coefficients of the transformed space, and $T^{-1}$ component 595 provides an inverse operation of the transform process, providing as output an approximation to residual MB.

ME component 560 is configured to operate as a motion estimator for estimating motion between Target frame (Tar 570) parts, such as MBs) and previously encoded reference frame or frames. Herein, ME component 560 may use inter-prediction between video frames, and provide as output a motion-vector. In one embodiment, ME component 560 may be configured to operate on components of the image, such as 8×8 pixels, 4×4 pixels, or the like.

MC component 561 is configured to operate as a motion compensator using the output motion-vector of ME component 560, reference image parts are compensated for motion between target and reference frame/frames by, in one embodiment, a sub-pixel interpolation. In one embodiment, MC component 561 may be employed for inter-prediction between video frames. An output of MC component 561 is an interpolated part of the reference image, or a blending between several reference images. In one embodiment, the output may be at the size of a MB.

Intra-Prediction component 562 is configured to provide a predictor to a currently encoded MB, using, in one embodiment, neighbor pixels of a current frame, such as pixels from neighbor MBs, which may already passed encoding.

Inter/intra selection component 563 is configured to select between inter or intra prediction modes, taking, in one embodiment, one of the inputs which provides a lowest coding rate while maintaining what is determined as a definable visual quality. In one embodiment, component 563 may be known as a rate distortion component.

In any event, as discussed above, the output to EE 501 is then a bit-stream representing the compressed target frame, which may then be provided for storage, or transfer to another device. As noted above, EE 501 includes Y/C based modulation component 551, which is described in more detail in conjunction with FIG. 6.

Figure 6:
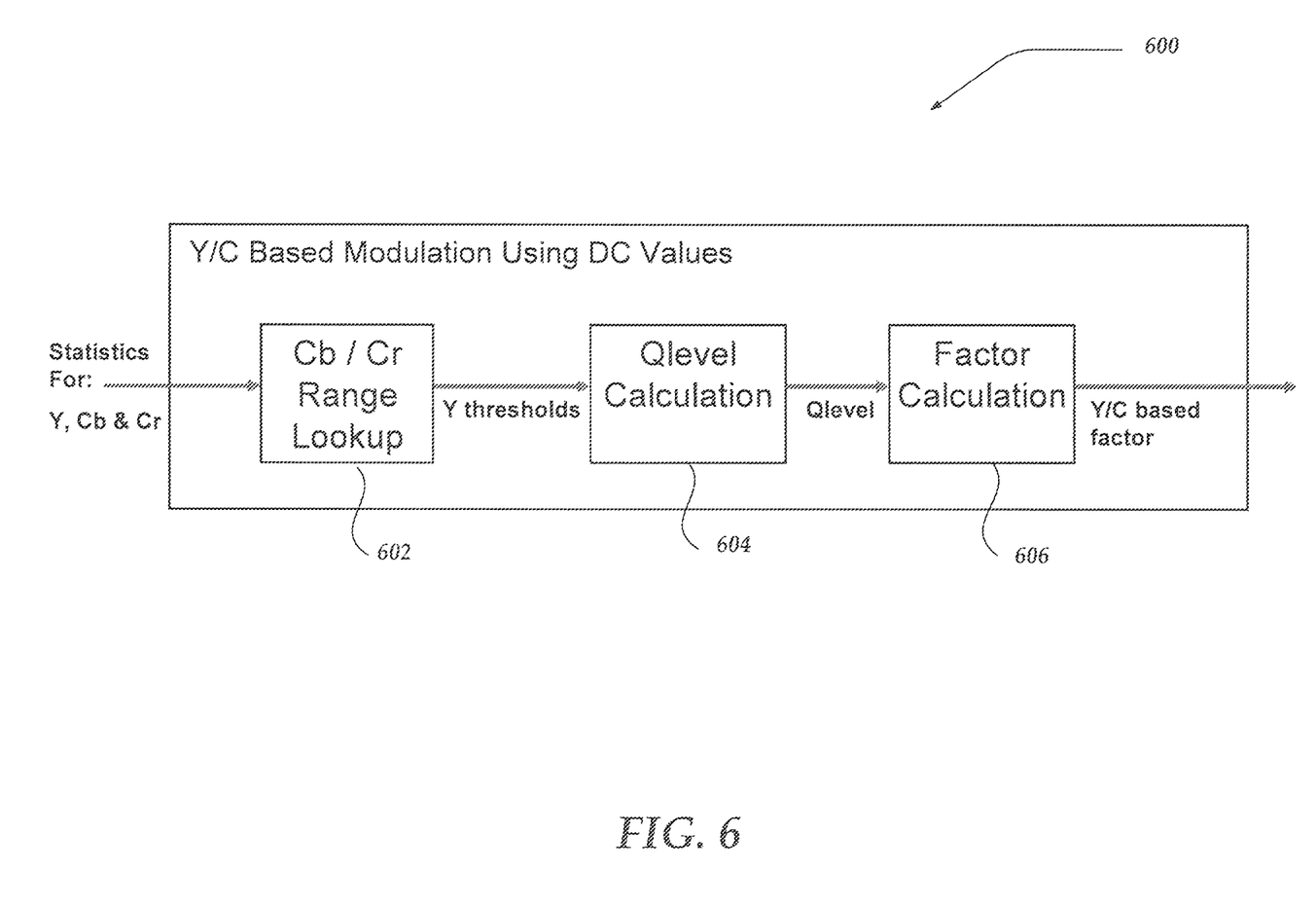
FIG. 6 illustrates one embodiment of a Y/C based modulation component useable within the enhanced image encoder.

FIG. 6 illustrates one embodiment of Y/C based modulation component 551 useable within system 500. System 600 of FIG. 6 may include many more or less components than those shown. The components shown, however, are sufficient to disclose an illustrative embodiment for practicing the invention.

As shown, system 600 receives statistical data about a luminance component Y, and two complementary components, Cb and Cr. As noted above, in one embodiment, the statistics include an average or d.c. value for each of these components. Other statistics may also be used, however.

System 600 includes Cb/Cr range lookup component 602, Qlevel Calculation component 604, and Factor Calculation component 606 to generate a Y/C based modulation factor that is determined from at least the average (or d.c.) factors of the components.

Cb/Cr range lookup component 602 is configured to determine at least one luminance saturation threshold using range data and associated average values for each of the complementary chrominance components for each sub-block of a current MB within the current Target frame. Any of a variety of mechanisms may be employed to determine the at least one threshold, including a table lookup, a database, a spreadsheet, an equation, or the like.

Figure 7:
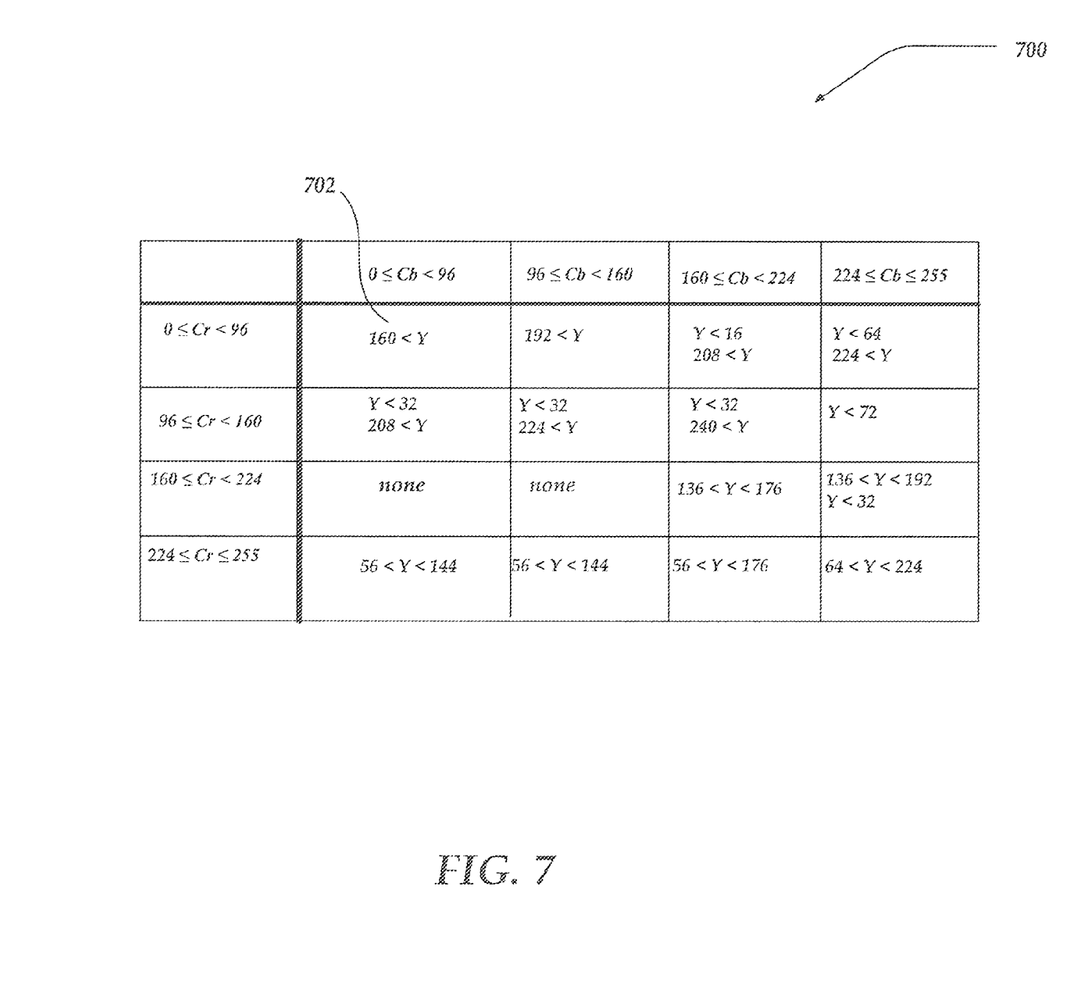
FIG. 7 illustrates one non-limiting, non-exhaustive example of a Luminance, Y, range table using Y/C average (or d.c.) factors to determine luminance saturation threshold(s)

As the human eye is typically less sensitive to details/artifacts when a combination of luma/chroma values create a saturated color, Table 700 of FIG. 7 may represent one embodiment, of one non-limiting, non-exhaustive example of a Luminance, Y, range table using Y/C average (sometimes called d.c.) factors to determine luminance saturation threshold(s). It should be noted that saturation thresholds may also be determined for chrominance components as well. When conditions of a given cell of Table 700 are satisfied, a saturation interval and respective saturation threshold(s) may be obtained from information within the cell. When the MB or sub-block within the MB is considered saturated based on information from Table 700, a quantization factor may then be set to a larger value.

Consider for example, a MB having a Cb average value between 0 and 96, and a Cr average value between 0 and 96. Using these range values, Cell 702 of Table 700 may then be selected that indicates at least one saturation threshold of 160<Y. It is noted that given a desired goal for quality, a given cell within Table 700 may yield no saturation threshold, a single threshold, or even multiple saturation thresholds.

It should be noted that the values in Table 700 may be re-configured according to different criteria, such as to achieve different objectives in image quality. For example, where it might be desirable to encode human faces with higher quality than a rest of an image, the table may be re-configured with different values to achieve this goal.

Processing proceeds next to Qlevel calculation component 604, where several terms may be defined for use:

Qlevel—an element which affects the quantizer modulation. Typically, the higher the value of the Qlevel, the coarser the quantization will be.

DEEP_SAT—defines a deep saturation location on a Y axis, typically starting at this distance from a saturation border (in a direction towards a saturation area), and is used to assign a maximum Qlevel threshold.

FAR_FROM_SAT—represents a minimum Qlevel threshold, typically starting from this distance from the saturation border (in a direction away from the saturation area).

$$\text{Max\_Qlevel}=(\text{DEEP\_SAT}+\text{FAR\_FROM\_SAT}+1)$$

In one embodiment, possible values for Qlevel are: $1 \leq \text{Qlevel} \leq \text{Max\_Qlevel}$.

However, other values may also be selected. Further, in one embodiment, DEEP_SAT and FAR_FROM_SAT may be selected as DEEP_SAT=8 and FAR_FROM_SAT=32. However, other values can be used as well to improve the encoding of areas which the human eye may be more sensitive to with comparison to other areas of an image. Typically, larger values of FAR_FROM_SAT and DEEP_SAT indicate that the decrease/increase in quality may be done more gradually. For values close to a saturation border, but not far enough to be considers as DEEP_SAT or FAR_FROM_SAT, an intermediate value between 1 and Max_Qlevel may be selected from values along a curve.

That is, given the at least one saturation threshold and statistics for the luminance component, a quantization level, Qlevel for the given MB or sub-block may be determined. This may be achieved using any of a variety of techniques, including using a non-linear equation, a function look-up table (LUT), linear interpolation, or any of a variety of ways.

Figure 8:
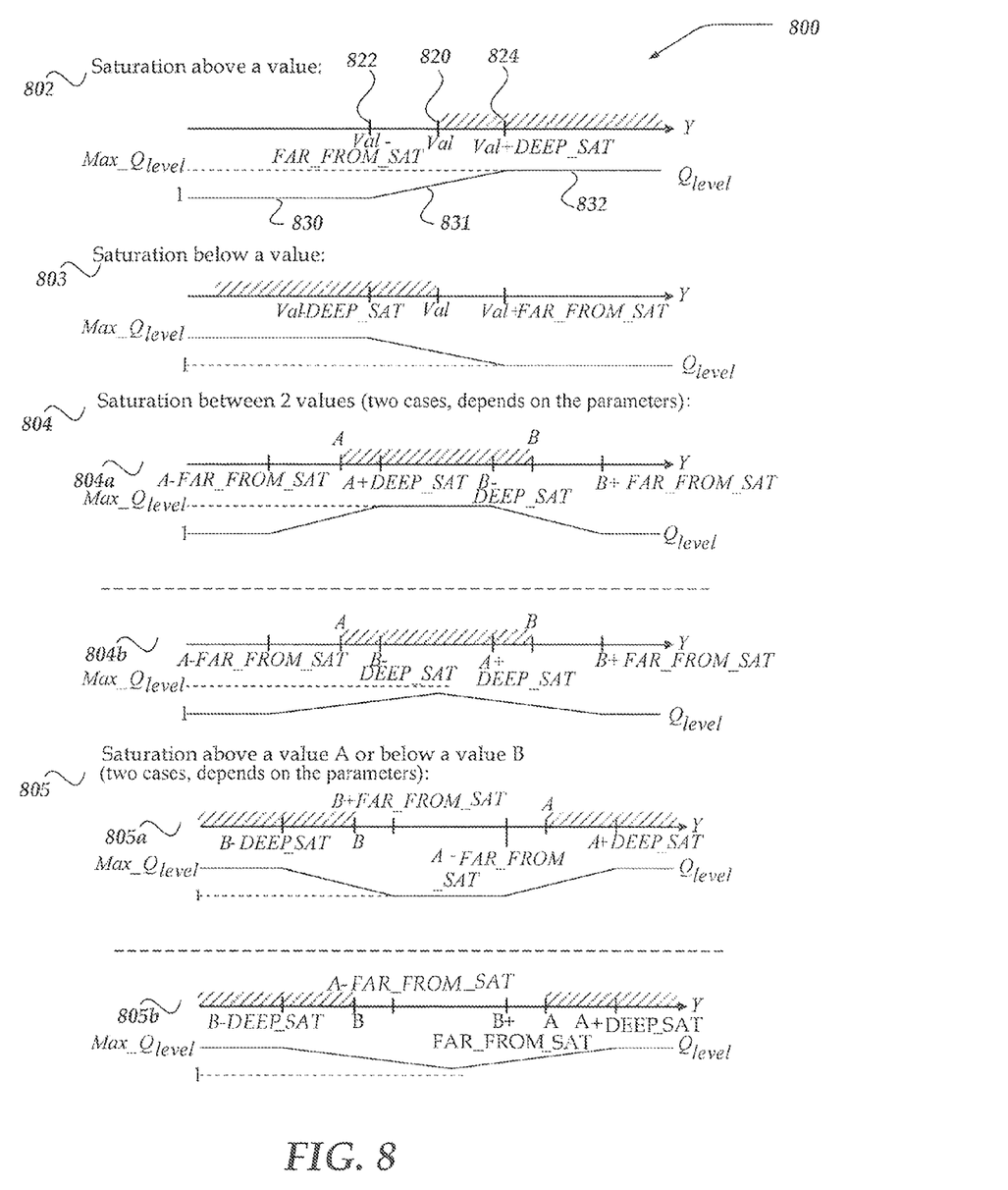
FIG. 8 illustrates one non-limiting, non-exhaustive example of a mechanism useable to determine a Qlevel based on the determined luminance saturation threshold(s).

FIG. 8 illustrates one non-limiting, non-exhaustive example of a mechanism useable to determine a Qlevel based on the determined luminance saturation threshold(s), and the at least one luminance saturation threshold. As shown, charts 800 include a plurality of charts 802-805. It should be understood that more or less charts may be employed based in part on Table 700 of FIG. 7. As noted, because some of the cells of Table 700 include multiple saturation thresholds, charts 800 may illustrate charts having a multiple sub-charts, such as 804a and 804b, 805a and 805b.

Again, FIG. 8 provides a simple visual way for understanding how the Qlevel is determined by Qlevel calculation component 604. However, other mechanisms may also be used. Thus, embodiments are not to be construed as being limited to a particular mechanism for determining the Qlevel.

In any event, for each sub-block of the MB, and the appropriate Cb/Cr cell, a Qlevel may be determined using a distance along a Y average or sum from a saturation border/borders for a selected chart 802-805. As an example, consider the above example, where a single "saturation above a value," (160<Y) was determined. This indicates that chart 802 of charts 800 may be selected, where 160 is Val (item 820) on chart 802. From the above definitions, the lower Y threshold may be determined as Val−FAR_FROM_SAT=160−32=128 (see item 822 on chart 802); and the upper Y threshold as Val+DEEP_SAT=160+8=168 (see item 824 on chart 802). In one embodiment, the average value for the Y component of the sub-block may then be located along the Y axis of chart 802. If it exceeds a threshold value, the resulting Qlevel output is set to the exceeded threshold curves 830 or 832). Otherwise, the Qlevel is set based on where along the curve 831 of chart 802 the Y statistic is located. It should be noted that while curve 831 is illustrated as a straight line between curves 830 and 832, other embodiments are also envisaged. Thus, curve 830 may be non-linear, for example.

Continuing with FIG. 6, the Qlevel from Qlevel Calculation component 604 may be provided to Factor Calculation component 606, where the Qlevel is combined with an average Qlevel of a previous frame of the image to calculate a modulated Q Factor. In one embodiment, the Q Factor may be determined as:

$$QFactor = \frac{2Q_{level} + AverageQ_{level}}{Q_{level} + 2AverageQ_{level}}$$

where AverageQ$_{level}$ represents the Average Qlevel in a previous frame or an already coded frame in a sequence of frames. In one embodiment, where the current frame is a starting frame, the average Qlevel may be set to a default value. For example, the AverageQ$_{level}$ might be based on a desired modulation around a frame quantizer value that is intended to represent a desired budget of bits for a frame.

While the modulation ratio of 2 is illustrated in the equation above, it should be understood that other values may also be selected. Typically, the higher the value of the modulation ratio, the stronger the variations in the resulting Q Factor values.

In one embodiment, the Q Factor may also be range limited, such as in a range of between ½ to 2, for example. However, other values may also be selected based on a desired modulation around a given frame quantizer, including 'n' as discussed elsewhere. In any event, the output of Factor Calculation component 606 represents a Y/C based modulation factor based on at least d.c. factors of the components of the sub-block, and may be used as a quantizer, as discussed above, to encode a transformation of the sub-block.

It will be understood that each component of the illustrations of FIGS. 5-8, and combinations of components in these illustrations, can be implemented by computer program instructions. These program instructions may be provided to a processor to produce a machine, such that the instructions, which execute on the processor, create means for implementing the actions specified in the flow component or components. The computer program instructions may be executed by a processor to cause a series of operational steps to be performed by the processor to produce a computer-implemented process such that the instructions, which execute on the processor to provide steps for implementing the actions specified in the flow component or components. The computer program instructions may also cause at least some of the operational steps shown in the components of the flows to be performed in parallel. Moreover, some of the steps may also be performed across more than one processor, such as might arise in a multi-processor computer system. In addition, one or more components or combinations of components in the flow illustrations may also be performed concurrently with other components or combinations of components, or even in a different sequence than illustrated.

Accordingly, components of the flow illustrations support combinations of means for performing the specified actions, combinations of steps for performing the specified actions and program instruction means for performing the specified actions. It will also be understood that each component of the flow illustrations, and combinations of components in the flow illustrations, can be implemented by special purpose hardware-based systems, which perform the specified actions or steps, or combinations of special purpose hardware and computer instructions.

It should be noted that while the above discussions disclose computations for each sub-block or block within a macro-block (MB), in other embodiments, the processing may be performed for each macro-block (MB).

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A processor based method, comprising:
for each macro-block (MB) or sub-block within each MB of a target frame to be encoded, executing instructions within a processor to perform actions, including:
determining statistics based on a luminance component and statistics based on one or more complementary chrominance components, the one or more complementary chrominance components each being based on a difference between a color component and the luminance component;
determining at least one saturation threshold using values of the one or more complementary chrominance components, the at least one saturation threshold identifying a condition in which luminance saturation or chrominance saturation occurs;
determining a quantization level (Qlevel) based on the at least one saturation threshold and the statistics based on the luminance component;
calculating a quantizer modulation factor for the MB or sub-block within the MB by combining the Qlevel with an average Qlevel of a previous frame already encoded;
calculating a final quantizer using a base quantizer and the calculated quantizer modulation factor;
encoding the MB or sub-block within the MB using at least the final quantizer; and
storing the encoded MB or sub-block within the MB as a bitstream on a storage device or transmitting the encoded MB or sub-block within the MB over a network as a bit-stream;
wherein determining the statistics comprises determining an average and a variance of the luminance component within a given MB or sub-block, and an average and a variance of each complementary chrominance component within the given MB or sub-block.

2. The method of claim 1, wherein determining at least one saturation threshold further comprises determining saturation intervals ranges based on ranges for at least one statistic associated with each of the complementary chrominance components.

3. The method of claim 1, wherein determining the Qlevel further comprises:
for each MB or sub-block within a macro-block (MB) of a target frame to be encoded:
when an average luminance for a given MB or sub-block is determined to exceed the at least one saturation threshold, setting the Qlevel to the at least one saturation threshold; and
otherwise, determining the Qlevel based on a distance of the average luminance from the at least one saturation threshold along a curve.

4. The method of claim 1, further comprising:
for each macro-block (MB) or sub-block within a MB of a target frame of an image:
determining an activity level for at least each of the complementary chrominance components using a ratio of maximum and minimum pixel values;
calculating an Activity based modulation Factor using the determined activity level with an average activity of the previous frame of the image; and
combining the Activity based modulation Factor with the calculated quantizer modulation factor for use in calculating the final quantizer for the encoding.

5. The method of claim 1, wherein encoding a MB or sub-block uses a base quantizer from a bit rate controller multiplied by at least the calculated quantizer modulation factor.

6. An image system, comprising:
a device useable to receive one or more image frames; and
a processor that performs actions, including:
for each macro-block (MB) or sub-block within each MB of a target frame selected from the one or more image frames:
determining statistics based on a luminance component and statistics based on one or more complementary chrominance components, the one or more complementary chrominance components each being based on a difference between a color component and the luminance component;
determining at least one saturation threshold using the determined statistics for the one or more complementary chrominance components, the at least one saturation threshold identifying a condition in which luminance saturation or chrominance saturation occurs;
determining a quantization level (Qlevel) based on the at least one saturation threshold and the statistics based on the luminance component;
calculating a quantizer modulation factor by combining the determined Qlevel with an average Qlevel of a previous frame of the image;
calculating a final quantizer using a base quantizer and the calculated quantizer modulation factor; and
encoding the MB or sub-block within the MB using at least the base quantizer;
wherein determining the statistics comprises determining an average and a variance of the luminance component within a given MB or sub-block, and an average and a variance of each complementary chrominance component within the given MB or sub-block.

7. The image system of claim 6, wherein the processor is configured to perform actions, further including:
determining a rate distortion prediction for each MB or sub-block of the MB;
determining a residual value for each MB or sub-block of the MB based on a difference between each given MB or sub-block of the target image and the rate distortion prediction for each MB or sub-block of the MB; and
using the resulting residual value for each MB or sub-block as input to a transformation that transforms the residual from an image domain to a frequency domain.

8. The image system of claim 6, wherein encoding the MB or sub-block within the MB further comprises performing an entropy coding using a lossless data compression mechanism.

9. The image system of claim 6, wherein determining at least one saturation threshold further comprises determining saturation ranges based on ranges for a statistic associated with one or more of the complementary chrominance components.

10. The image system of claim 6, wherein determining the Qlevel further comprises:
for each MB or sub-block within a macro-block (MB) of a target frame to be encoded:
when an average luminance for a given MB or sub-block is determined to exceed the at least one saturation threshold, setting the Qlevel to the at least one saturation threshold; and
otherwise, determining the Qlevel based on the average luminance and the at least one saturation threshold.

11. The image system of claim 6, wherein encoding a MB or sub-block using at least the calculated quantizer modulation factor multiplied by a Base Quantizer from a bit rate controller.

12. An apparatus for encoding image data, comprising:
a transceiver for receiving one or more image frames of image data; and
one or more circuit cards configured to perform actions, including:
determining statistics based on a luminance component and statistics based on one or more chrominance components, the one or more chrominance components each being based on a difference between a color component and the luminance component;
determining at least one saturation threshold using one or more of the determined statistics of the one or more chrominance components, the at least one saturation threshold identifying a condition in which luminance saturation or chrominance saturation occurs;
determining a quantization level (Qlevel) based on the at least one saturation threshold and the statistics based on the luminance component;
calculating a quantizer modulation factor by combining the determined Qlevel with an average Qlevel of a previous frame of the image;
calculating a final quantizer using a base quantizer and the calculated quantizer modulation factor; and
encoding the MB or sub-block within the MB using at least the final quantizer;
wherein determining the statistics comprises determining an average and a variance of the luminance component within a given MB or sub-block, and an average and a variance of each chrominance component within the given MB or sub-block.

13. The apparatus of claim 12, wherein determining at least one saturation threshold further comprises determining saturation ranges based on ranges of the chrominance components.

14. The apparatus of claim 12, wherein determining the Qlevel further comprises:
for each macro-block (MB) or sub-block within a MB of a target frame of an image:
when an average luminance for a given MB or sub-block is determined to exceed the at least one saturation threshold, setting the Qlevel to the at least one saturation threshold; and
otherwise, determining the Qlevel based on a distance of the average luminance from the at least one saturation threshold.

15. The apparatus of claim 12, wherein the one or more circuit cards are configured to perform actions, further including:
for each macro-block (MB) or sub-block within a MB of a target frame to be encoded:

determining an activity level for at least each of the chrominance components using a ratio of maximum and minimum pixel values;

calculating an Activity based modulation Factor using the determined activity level and the average activity of the previous frame already encoded;

combining the Activity based modulation Factor with the calculated quantizer modulation factor;

calculating the final quantizer using a base quantizer and the calculated quantizer modulation factor; and encoding the MB or sub-block within a MB using the final quantizer.

16. The apparatus of claim 12, wherein encoding a MB or sub-block using a final quantizer calculated by at least the calculated quantizer modulation factor multiplied by Base Quantizer from a bit rate controller.

17. The apparatus of claim 12, wherein the one or more circuit cards are configured to perform actions, further including:

determining a rate distortion prediction for each MB or sub-block of the MB;

determining a residual value of for each MB or sub-block of the MB based on a difference between each given MB or sub-block of the target image and the rate distortion prediction for each MB or sub-block of the MB; and using the resulting residual value for each MB or sub-block as input to a transformation, wherein the transformation transforms the residual from an image domain to a frequency domain.

* * * * *